Patented May 6, 1924.

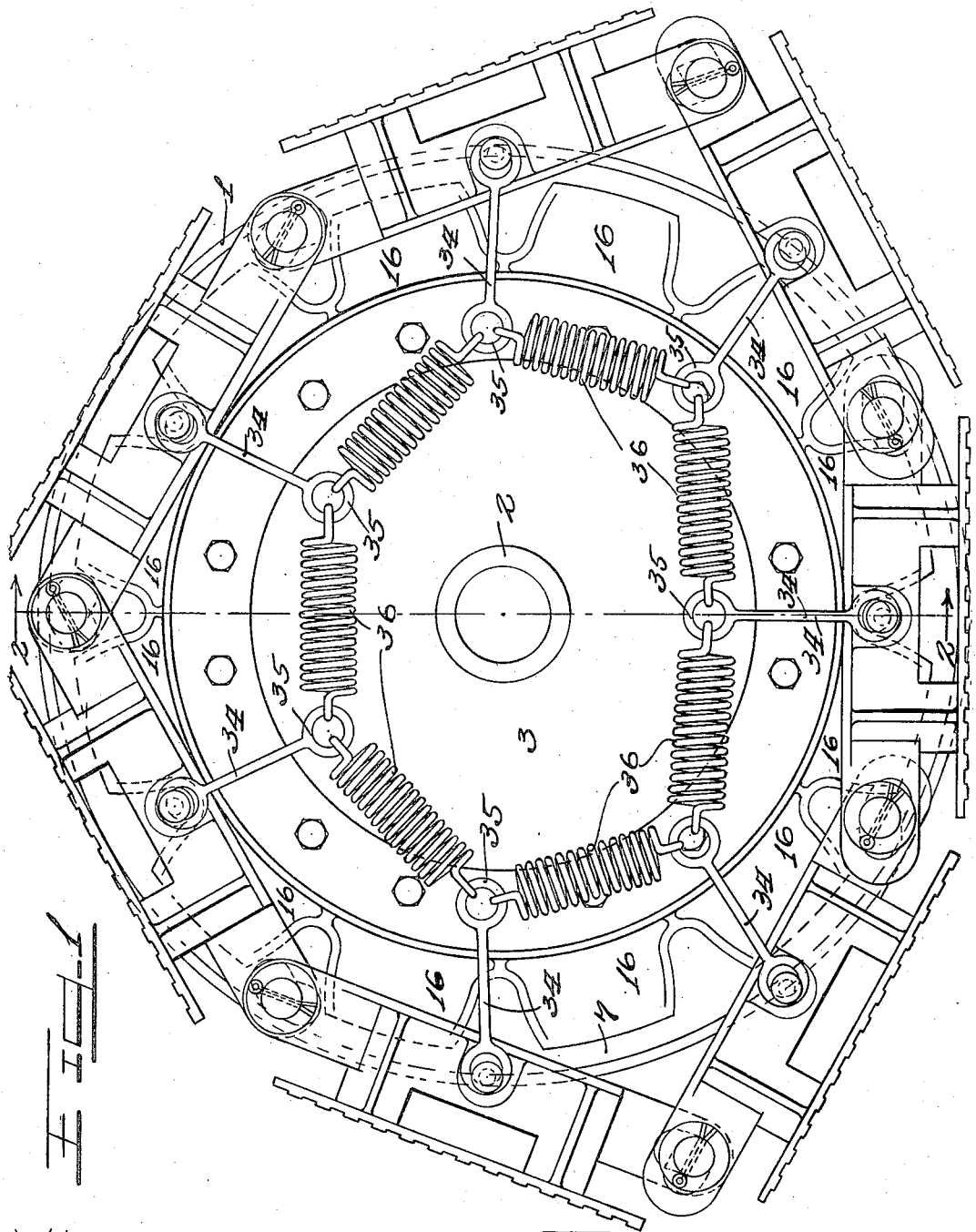

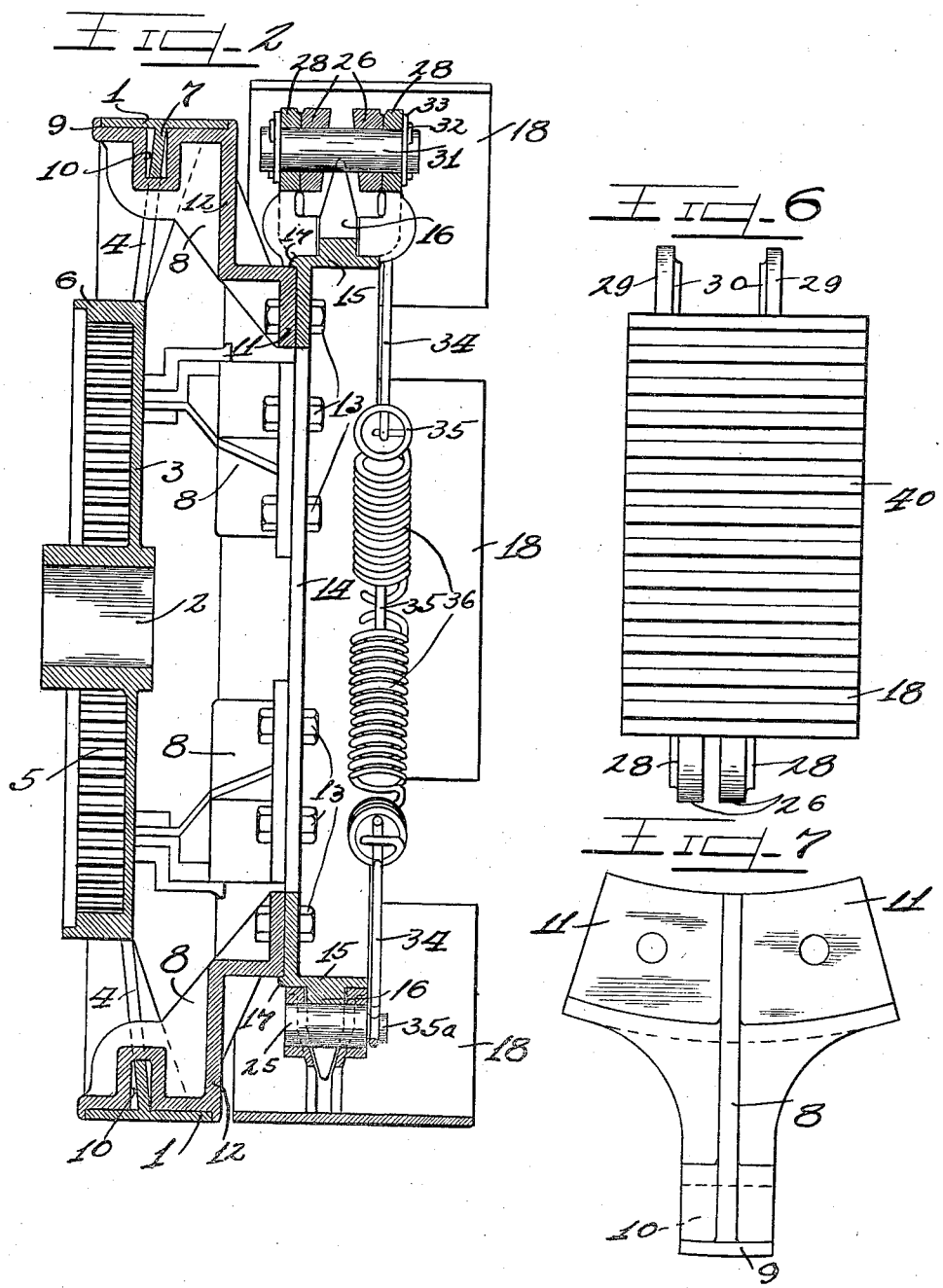

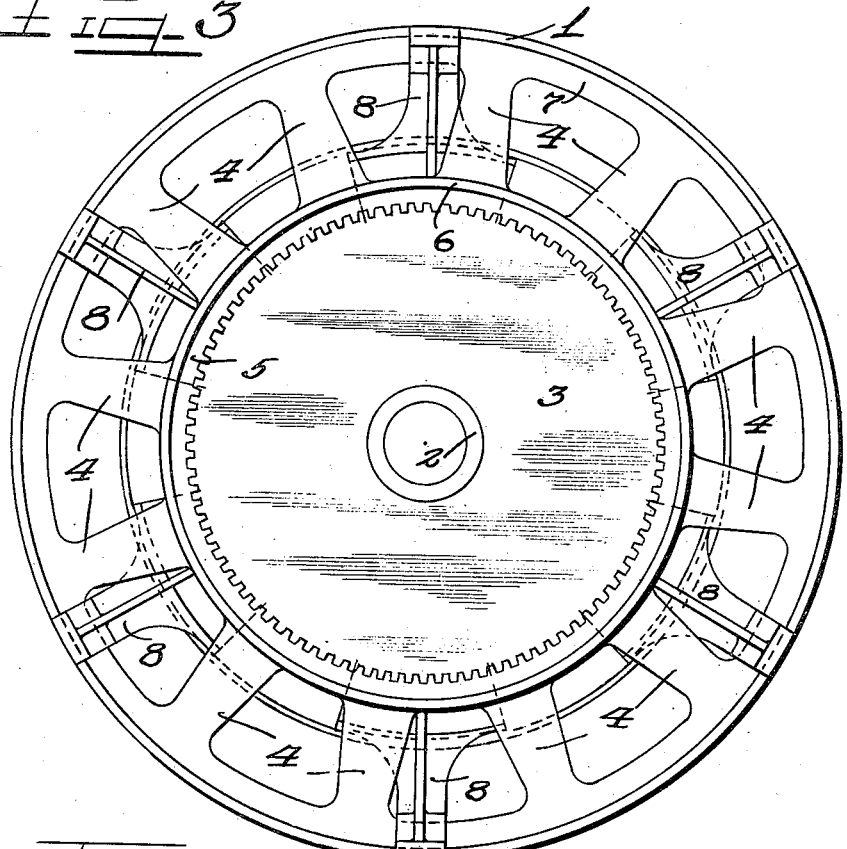
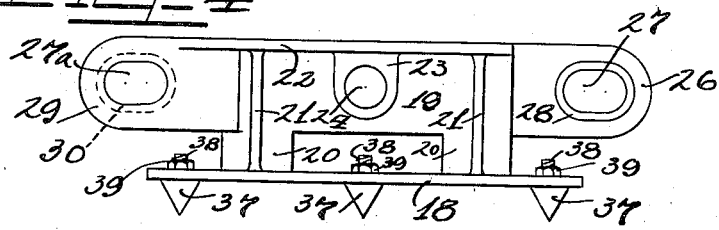
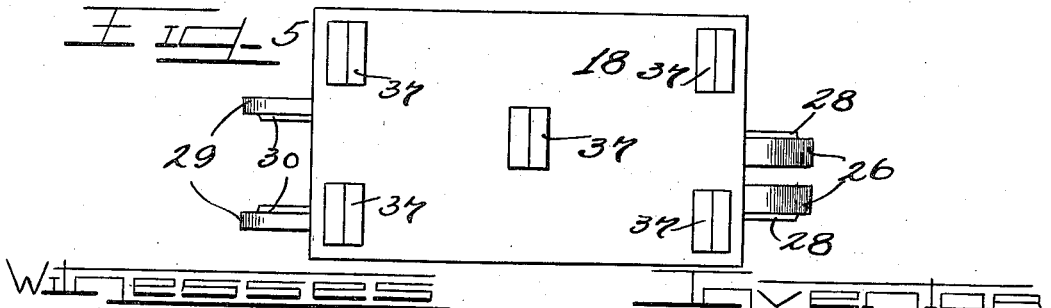

1,492,695

UNITED STATES PATENT OFFICE.

ROYAL R. MILLER, OF CHICAGO, ILLINOIS, ASSIGNOR, BY MESNE ASSIGNMENTS, TO MILLER TRACTION TREAD COMPANY, OF CHICAGO, ILLINOIS, A CORPORATION OF DELAWARE.

TRACK-LAYING TREAD ATTACHMENT FOR DRIVE WHEELS.

Application filed October 27, 1920. Serial No. 420,050.

*To all whom it may concern:*

Be it known that I, ROYAL R. MILLER, a citizen of the United States, and a resident of the city of Chicago, in the county of Cook and State of Illinois, have invented certain new and useful Improvements in a Track-Laying Tread Attachment for Drive Wheels; and I do hereby declare that the following is a full, clear, and exact description of the same, reference being had to the accompanying drawings, and to the numerals of reference marked thereon, which form a part of this specification.

This invention relates to a track-laying tread attachment for drive wheels, and particularly to an attachment which is adapted to be conveniently attached to the drive wheels of existing types of tractors and similar automotive vehicles to increase the tractive efficiency of the same.

While the ordinary type of tractor drive wheel proves satisfactory and is often preferable for light work or travel on highways, the traction afforded thereby is inadequate for heavy work, such as plowing in soft ground or travelling over muddy roads.

It is therefore highly desirable that means be provided which may be quickly and conveniently attached to an ordinary drive wheel to convert the same into a track-laying tread type drive wheel.

It is an important object of this invention to provide a track-laying tread attachment which is adapted to be quickly and conveniently attached to existing types of drive wheels of automotive vehicles.

It is also an object of this invention to provide a detachable track-laying type tread wherein gear driven tread elements are maintained in the proper rolling relation with the gear drive therefor.

It is a further object of this invention to provide a gear driven track-laying tread which has resilient means associated therewith for holding the tread in proper relation to the driving gear therefor.

It is finally an important object of this invention to provide a track-laying tread which may be attached to drive wheels of existing types of automotive vehicles without altering the same.

Other and further important objects of this invention will be apparent from the disclosures in the specification and the accompanying drawings.

The invention (in a preferred form) is shown on the drawings and hereinafter more fully described.

On the drawings:

Figure 1 is an elevation of a tractor drive wheel equipped with the improved track-laying tread attachment of this invention.

Figure 2 is a section on the line 2—2 of Figure 1.

Figure 3 is an inside elevation of the tractor wheel, with parts omitted, showing the method of attaching the support for the track-laying tread.

Figure 4 is a side elevation of one of the tread elements.

Figure 5 is a bottom plan view of the same.

Figure 6 is a bottom plan view of a modified form of tread element.

Figure 7 is an enlarged detail elevation of one of the attaching brackets.

As shown on the drawings:

The track-laying tread device of this invention is adapted to be detachably secured to a standard type of tractor drive wheel which ordinarily comprises a rim 1, which is supported from a hub 2, by means of a plate 3 and a plurality of spokes 4. For transmitting power to said drive wheel a peripheral flange 6 is formed on the inner side of said plate 3 and an internal gear 5 is formed inside said flange and adapted to mesh with a driving pinion which is driven from the source of power of the vehicle on which said drive wheel is mounted. Said spokes 4 are ordinarily connected by a flange 7, which is clearly shown in Figures 2 and 3, and which is integral with or connected to the inner side of the rim 1 near the center thereof.

For detachably securing the track-laying tread mechanism to said tractor wheel, a plurality of brackets 8 are provided and the outer ends of said brackets are provided with integral flanges 9, which are adapted to engage the outer edges of the rim 1, while recesses 10 formed in the brackets between said flanges are engaged around the rim 7. Said brackets 8 extend angularly outwardly from the rim 1 and at their outer ends are provided with apertured plate portions or surfaces 11 which are ordinarily in a plane parallel to the plane of the drive wheel. To afford a strong reinforced construction said brackets 8 are provided with angle portions 12 integral therewith and connecting the plate portions 11 with the flanges 9 and the recessed portions 10. Said brackets 8 are ordinarily engaged on the tractor wheel adjacent the spokes 4 and in a position in advance of the same, relative to the direction in which the wheel is rotating whereby the rotation of the drive wheel is positively transmitted to the same.

Secured to the flat surfaces 11 on the brackets 8 by means of bolts 13 is an annular plate 14 which is provided with an outwardly extending integral flange 15 on which gear teeth 16 are formed. Said gear teeth 16 are designed to be engaged by track-laying tread elements to be described hereinafter, and, as shown in Figure 2, said teeth are of approximately the width of a double involute gear. In order that said gear teeth 16 may positively engage the tread element under adverse conditions, the outer ends thereof are tapered inwardly so that the width and thickness of the gear tooth are both diminished at its outer end, as clearly shown in Figures 1 and 2.

In order that the annular plate 14 and the gear 16 thereon may be securely supported on the bracket 8, an extension 17 is provided on the flange 15 extending inwardly therefrom and is engaged over the outer end of the angle portion 12 of the bracket 8.

The construction of the track-laying tread elements which, together with the gear teeth 16; provide an arrangement which converts the ordinary drive wheel into a track-laying type drive wheel, will now be described. Said tread elements, which are clearly shown in Figures 4 and 5, comprise a tread plate 18, on which integral spaced links 19 are supported by means of integral bosses 20 and reinforced by integral rims 21 and flanges 22. Integral bosses or facings are provided on the outside of each of said links 19, and registering apertures 24 in said bosses are adapted to receive tooth engaging pins 25 which are engaged by the teeth 16 as the wheel rotates to move the tread elements forwardly.

Means are provided for pivotally connecting the tread elements together with a lost motion connection so that they will at all times maintain a proper rolling engagement with the gear teeth 16. Extending outwardly from one end of the link 19 are a pair of spaced members 26 which are provided with registering longitudinal slots 27 and formed around the edges of each of said slots on the members 26 is an outwardly extending facing 28. Formed at the opposite end of the links 19 and extending outwardly therefrom are a pair of spaced members 29 which are provided with registering longitudinal slots 27ª similar to the slots 27 and which are adapted to be engaged over the outwardly extending facing 28 on the member 26 of an adjacent tread member. Formed around the slots in said members 29 are inwardly extending facings 30, which are similar to the facings 28 and adapted to engage the same to reduce the friction between the inside of the members 29 and the outside of the members 26 on an adjacent tread member. The ends of adjacent tread elements are thus connected together by engaging the members 28 on the end of one member over the members 26 on the end of the adjacent member and engaging a pin 31 through the longitudinal slots 27 therein. Said pin 31 may be conveniently secured in position in the slots 27 by means of cotter pins 32 and washers 33.

Resilient means are provided to aid in maintaining the proper position of the tread elements relative to the gear teeth 16 and also for taking up the play in said tread elements and eliminating noise. Said means comprise links 34, which are removably engaged around grooved extensions 35ª on the outer ends of each of the pins 25. Said links 34 extend inwardly and have eyes 35 formed at their inner ends, said eyes serving to connect together adjacent ends of coiled springs 36 which form a continuous resilient connection between the inner ends of the links 34.

A variety of means may be employed for insuring a positive engagement between the plates 18 on the tread elements and the surface over which the vehicle is travelling. As shown in Figures 4 and 5, said plates 18 may be provided with lugs 37 which are removably secured thereto by means of threaded portions 38 extending inwardly from said lugs and nuts 39 engaged on said portions inside the plates 18. In the construction shown in Figures 1 and 6, the plates 18 are provided with integral ribs 40, which afford a positive engagement with the surface over which the vehicle is travelling.

The operation is as follows:

The track-laying tread of this invention may be conveniently attached to the drive wheels of any automotive vehicle by simply engaging the brackets 8 on the inner side of the rims of said drive wheels adjacent the spokes thereof and subsequently securing the annular plate 14 to said brackets. The track-laying tread elements are then engaged over the teeth 16 carried by the flange 15 on said plate 14, and as said teeth are rotated by the rotation of the wheel they engage the pins 25 or 31 and thus move the said elements forwardly. Due to the provision of the longitudinal slots 27 and 27ª in the members 26 and 28 whereby said tread elements are movable relative to each other and relative to the pins 31, a true rolling relation between the gear teeth 16 and said tread elements is maintained at all times.

On account of the tapered outer ends of the gear teeth 16, they are adapted to enter easily into the recesses provided between the member 26 and the pins 25 or 31, and the danger of the tread elements being forced out of position due to foreign matter or the inexact engagement of the teeth 16 is greatly minimized.

The resilient connection afforded by the coiled springs 36 and the links 34 is also adapted to maintain the tread elements in proper position and to prevent rattling thereof. This is a particularly desirable construction where the track-laying tread is to be used on vehicles such as army trucks, which do considerable travelling over highways. Worn or broken tread elements may be easily replaced by removing the pins 31, and said pins 31 and the pins 25 may also be conveniently replaced.

It is apparent from the foregoing description that the addition of the track-laying tread to the drive wheel provides means whereby a high tractive efficiency is attained. Since the forward movement of the wheel with the gear teeth 16 thereon causes a forward movement of the tread elements, and since said tread elements are moved successively into flat engagement with the surface over which the vehicle is travelling, there is little likelihood of slippage, and due to the larger tread surface contacting said surface the danger of the drive wheel sinking in muddy or soft ground is lessened.

This invention in providing a detachable track-laying tread mechanism makes possible the use of ordinary tractors for doing heavy work under conditions which have hitherto been considered impossible. Because of the detachable feature, it is possible to secure this result without change in the original tractor or vehicle construction and said tractor or vehicle may be used with its original round drive wheel for doing ordinary light work. While the connecting brackets 8, which have been shown and described herein, are particularly adapted for use with a great many types of tractor drive wheels, it is of course understood that the design and dimensions of said connection bracket may be varied to adapt the same to the construction of drive wheels on which the attachment is to be used.

I am aware that numerous details of construction may be varied through a wide range without departing from the principles of this invention, and I therefore do not purpose limiting the patent granted otherwise than necessitated by the prior art.

I claim as my invention:

1. The combination with a drive wheel and the rim thereof, of a plurality of brackets removably secured to said rim and extending laterally therefrom, a toothed member removably secured to said brackets, a track laying tread mechanism engaging said toothed member and driven thereby, and interconnected spring means connected to said tread elements.

2. The combination with a drive wheel and the rim thereof, of a plurality of brackets removably attached to said rim and extending downwardly and laterally thereof and provided with a vertical attaching flange, a gear wheel attached to said flange, and a track laying tread mechanism driven by said gear.

3. The combination with a drive wheel and the rim thereof, of a plurality of brackets attached to said rim and extending laterally therefrom, a gear attached to said brackets, and a track laying tread trained over said gear and driven thereby.

In testimony whereof I have hereunto subscribed my name in the presence of two subscribing witnesses.

ROYAL R. MILLER.

Witnesses:
CARLTON HILL,
EARL M. HARDINE.